US012632879B2

(12) United States Patent
Eisen

(10) Patent No.: US 12,632,879 B2
(45) Date of Patent: May 19, 2026

(54) INTEGRATED TRAVEL AGENCY CRM, BOOKING, AND AGENT MANAGEMENT SYSTEMS INCLUDING GAMIFIED INCENTIVE PROGRAMS FOR INFLUENCERS AND AGENTS

(71) Applicant: David Eisen, Miami, FL (US)

(72) Inventor: David Eisen, Miami, FL (US)

( * ) Notice: Subject to any disclaimer, the term of this patent is extended or adjusted under 35 U.S.C. 154(b) by 0 days.

(21) Appl. No.: 19/190,898

(22) Filed: Apr. 28, 2025

(65) Prior Publication Data

US 2025/0335949 A1     Oct. 30, 2025

Related U.S. Application Data

(60) Provisional application No. 63/639,202, filed on Apr. 26, 2024.

(51) Int. Cl.
| | |
|---|---|
| *G06Q 30/0207* | (2023.01) |
| *G06Q 10/02* | (2012.01) |
| *G06Q 30/018* | (2023.01) |

(52) U.S. Cl.
CPC ......... *G06Q 30/0209* (2013.01); *G06Q 10/02* (2013.01); *G06Q 30/018* (2013.01); *G06Q 30/0215* (2013.01)

(58) Field of Classification Search
CPC .. G06Q 30/0209; G06Q 10/02; G06Q 30/018; G06Q 30/0215
USPC ........................ 705/14.12; 707/722; 709/226
See application file for complete search history.

(56) References Cited

U.S. PATENT DOCUMENTS

| | | | |
|---|---|---|---|
| 2014/0280952 A1* | 9/2014 | Shear ...................... | H04L 63/10 709/226 |
| 2016/0034305 A1* | 2/2016 | Shear ........................ | G06F 9/50 707/722 |
| 2016/0371799 A1* | 12/2016 | Miller ................ | G06Q 30/0226 |
| 2020/0134651 A1* | 4/2020 | Perry ................. | G06Q 30/0236 |
| 2022/0335513 A1* | 10/2022 | Thompson ............. | G06Q 30/08 |

(Continued)

OTHER PUBLICATIONS

Frank Depino, Win in 2024 with 16 Unique Travel Marketing Strategies, 2024 (Year: 2024).*

*Primary Examiner* — Tarek Elchanti
(74) *Attorney, Agent, or Firm* — The Rapacke Law Group, P.A.

(57) ABSTRACT

A system for providing an integrated travel agency CRM and booking system including influencer-driven and advertiser-driven lead generated and automated agent management is disclosed. The system includes at least one user computing device in operable connection with a user network. An application server is in operable communication with the user network to host an application program for providing an integrated travel agency CRM and booking system including influencer-driven and advertiser-driven lead generated and automated agent management. The application program includes a user interface module for providing access to the application program via the computing device. The application program includes a CRM module, an accounting and reporting module, an onboarding module, a leads/influencer marketplace module, a booking module, and an itinerary module. The system provides a gamified platform to optimize lead conversion, incentivize influencers to create advertisements, and provides detailed reports and booking data.

7 Claims, 3 Drawing Sheets

STEP 300: USER LOGS IN TO THE PLATFORM

STEP 310: INFLUENCER GENERATES A UNIQUE REFERRAL LINK WHICH IS ASSOCIATED WITH AN ADVERTISEMENT

STEP 320: ONCE A LEAD IS GENERATED AND A TRIP IS BOOKED, THE AGENCY AND STAKEHOLDERS ASSOCIATE AND DISPLAY THE ADVERTISEMENT THAT THE BOOKING WAS GENERATED THROUGH

STEP 330: USING THE GAMIFIED PLATFORM, THE INFLUENCER EARNS REWARDS WHICH MAY BE REDEEMED FOR FREE TRIPS OR OTHER INCENTIVES

STEP 340: SYSTEM DIRECTS PAYMENTS TO VARIOUS PARTIES TO ACCURATELY ACCOUNT FOR COMMISSIONS GENERATED FROM THE BOOKING TRANSACTION

STEP 350: SUPPLIERS ARE PROVIDED ACCESS TO A PORTAL ALLOWING THEM TO VIEW VARIOUS METRICS AND INTERACT WITH A MARKETPLACE

STEP 360: KPI REPORTS ARE GENERATED AND MADE ACCESSIBLE TO EACH PARTY

(56) References Cited

U.S. PATENT DOCUMENTS

| | | | |
|---|---|---|---|
| 2022/0385676 A1* | 12/2022 | Chen Kaidi | .......... G06F 21/554 |
| 2023/0010020 A1* | 1/2023 | Willingham | ......... G06Q 50/188 |
| 2025/0245277 A1* | 7/2025 | Peters | ................. G06F 16/9535 |

* cited by examiner

COMPUTING SYSTEM 100

APPLICATION PROGRAM 200

COMMUNICATION MODULE 202

DATABASE ENGINE 204

CRM MODULE 210

USER MODULE 212

ACCOUNTING AND REPORTING MODULE 214

DISPLAY MODULE 216

ONBOARDING MODULE 218

LEADS/INFLUENCER MARKETPLACE MODULE 220

BOOKING MODULE 222

ITINERARY MODULE 224

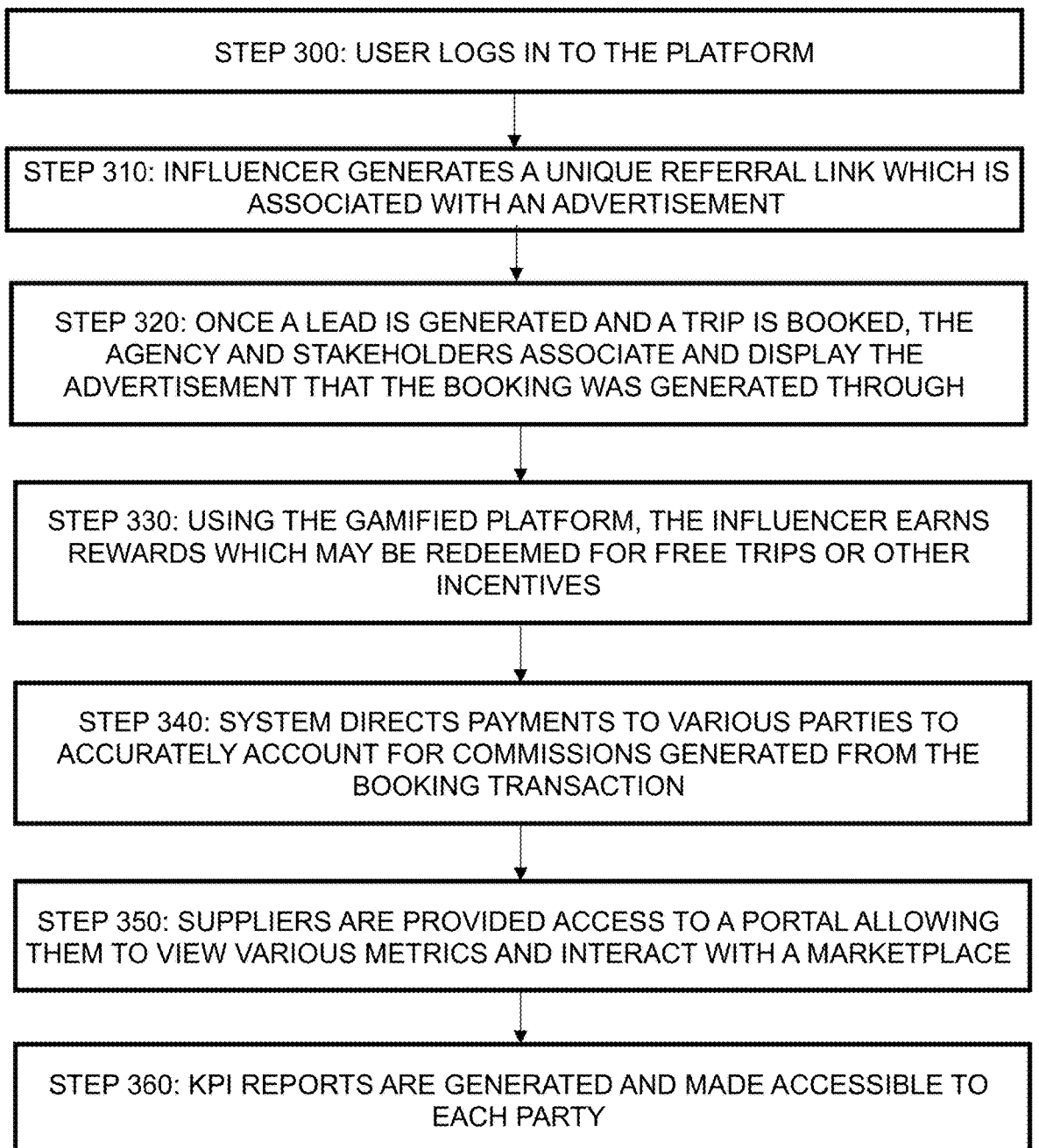

STEP 300: USER LOGS IN TO THE PLATFORM

STEP 310: INFLUENCER GENERATES A UNIQUE REFERRAL LINK WHICH IS ASSOCIATED WITH AN ADVERTISEMENT

STEP 320: ONCE A LEAD IS GENERATED AND A TRIP IS BOOKED, THE AGENCY AND STAKEHOLDERS ASSOCIATE AND DISPLAY THE ADVERTISEMENT THAT THE BOOKING WAS GENERATED THROUGH

STEP 330: USING THE GAMIFIED PLATFORM, THE INFLUENCER EARNS REWARDS WHICH MAY BE REDEEMED FOR FREE TRIPS OR OTHER INCENTIVES

STEP 340: SYSTEM DIRECTS PAYMENTS TO VARIOUS PARTIES TO ACCURATELY ACCOUNT FOR COMMISSIONS GENERATED FROM THE BOOKING TRANSACTION

STEP 350: SUPPLIERS ARE PROVIDED ACCESS TO A PORTAL ALLOWING THEM TO VIEW VARIOUS METRICS AND INTERACT WITH A MARKETPLACE

STEP 360: KPI REPORTS ARE GENERATED AND MADE ACCESSIBLE TO EACH PARTY

INTEGRATED TRAVEL AGENCY CRM, BOOKING, AND AGENT MANAGEMENT SYSTEMS INCLUDING GAMIFIED INCENTIVE PROGRAMS FOR INFLUENCERS AND AGENTS

CROSS-REFERENCE TO RELATED APPLICATIONS

This application claims the benefit of U.S. Provisional Patent Application No. 63/639,202, entitled "Integrated Travel Agency CRM, Booking, and Agent Management Systems Including Gamified Incentive Programs for Influencers and Agents", filed on Apr. 26, 2024, the entirety of which is hereby incorporated by reference.

TECHNICAL FIELD

The embodiments disclosed herein generally relate to computer-implemented customer relationship management (CRM) systems, and more particularly to travel agency CRM and booking systems with means for providing lead generation and automated agent management.

BACKGROUND

Customer relationship management refers processes in which businesses administer their interactions with customers. CRM systems compile data from various communication channels in order to allow a business to learn more about a target audience. This information can then be used to better engage with potential customers as well as manage and interact with existing and previous customers. CRM capabilities have been expanded in recent years to manage the entire life-cycle of the customer, from distributing targeted advertising, initial contact, sales processes, and customer retention.

In the current arts, CRM systems have been developed which focus on particular aspects of the broader CRM processes. However, these system do not combine features into a single cohesive and gamified platform to optimize various tasks.

SUMMARY OF THE INVENTION

This summary is provided to introduce a variety of concepts in a simplified form that is further disclosed in the detailed description of the embodiments. This summary is not intended for determining the scope of the claimed subject matter.

The embodiments provided herein relate to a system for providing an integrated travel agency CRM and booking system including influencer-driven and advertiser-driven lead generated and automated agent management. The system includes at least one user computing device in operable connection with a user network. An application server is in operable communication with the user network to host an application program for providing an integrated travel agency CRM and booking system including influencer-driven and advertiser-driven lead generated and automated agent management. The application program includes a user interface module for providing access to the application program via the computing device. The application program includes a CRM module, an accounting and reporting module, an onboarding module, a leads/influencer marketplace module, a booking module, and an itinerary module. The system provides a gamified platform to optimize lead conversion, incentivize influencers to create advertisements, and provides detailed reports and booking data.

The system provides a comprehensive platform for managing customer relationships while providing a gamified platform for incentivizing the generation of advertisements. The creator of the advertisement receives a reward (e.g., points) which can be redeemed for free travel experiences, or other incentives. The system also provides KPI reporting and other useful metrics which aid various parties in optimizing their business processes. Each component of the system described herein is integrated into a single platform and allows travel agencies, travel suppliers, influencers, and agents to work cooperatively throughout the client relationship management processes.

In one aspect, the CRM system functions in a similar manner to a traditional CRM system. The CRM system stores, manages, and processes client information, data storage, provides reminders and alerts, statuses, and other client-related information. The CRM may record booking data linked to clients, including product details, prices, revenues, commissions, confirmation numbers, vendor names, and travel dates. The CRM may interface with suppliers via an API or manual entry to exchange reservation data and processes credit card payments though API integrations.

In one aspect, the accounting and reporting system manages travel agency financial transactions including commission payments and employs algorithms to associate commissions with specific agents. The accounting and reporting system generates reports for suppliers, agencies, agents, and influencers on booking data and tracks advertisement campaign conversions. The accounting and reporting system may report on KPIs such as revenue, commissions, booking numbers, and booking details across various levels, integrating these insights with other modules.

The accounting and reporting system may be in operable communication with a collections management system which allows suppliers to pay the agency directly via a credit card, ach transaction, etc. The collections management system may transmit automated emails, messages, etc. to overdue vendors.

In one aspect, the onboarding system automates the onboarding of agents, verifies identification and bank details, and conducts background checks. The onboarding system automatically creates accounts for new agents and manages agent removal based on performance or other business criteria.

In one aspect, the leads system and influencer marketplace generates landing pages and web forms for influencers who earn points and commission splits from leads they have generated. The leads system and influencer marketplace is capable of associating bookings directly to specific ads or social networks to rewarding influencers with points redeemable for trips based on booking revenue. The leads system and influencer marketplace features tiered rewards for influencers and uses algorithms to manage lead distribution among agents and may also allow suppliers to view sales data linked to specific leads, sponsor influencers, and manage promotions.

In one aspect, the booking system connects with vendors to allow customers and agents to book trips seamlessly through the booking portal. The booking system may integrate data from other modules for a unified process. The booking system may also process or otherwise manage credit card transactions and is designed to eventually support direct client bookings through a public interface.

In one aspect, the itinerary builder generates detailed itineraries based on data from other modules to provide clients with comprehensive travel documents like PDFs or web app links for each trip which may encompass all travel elements.

In one aspect, an agent-facing travel booking system is provided which enables the agents to book complete trips with travel providers. This can include airfare (or other means of transportation), hotel bookings, rental car bookings, tours, transfers, etc. The accounting module and reporting system may then automatically account for the executed transactions.

The embodiments provide a CRM module enhanced specifically for travel industry applications. Traditional CRMs often lack the specificity required for travel booking data and client itinerary tracking. The system described herein captures and maintains comprehensive client records, booking history, associated vendors, confirmation numbers, and financial data like commission percentages and revenue amounts. It can also integrate with external supplier systems via API or manual data entry to synchronize reservation data. These travel-specific features help agencies better manage client relationships, anticipate travel needs, and personalize service offerings.

The accounting and reporting module adds intelligence to financial operations by automatically linking bookings to associated advertisements or influencer campaigns. Through advanced data processing and embedded algorithms, the system tracks how and where leads originate and assigns commission distributions accordingly. It also generates KPI dashboards to show revenue generated, lead-to-booking ratios, and campaign conversion metrics. This financial clarity is beneficial to agencies aiming to refine advertising strategies and prove ROI to clients or sponsors. Further, the module can be linked to a collections management system that automates reminders and payment processing for overdue supplier invoices.

The onboarding module automates the complex process of integrating new agents into the system. It allows prospective agents to submit identification, link financial accounts, and complete background checks through a streamlined digital interface. Based on performance data, such as client satisfaction, sales volume, or booking accuracy, the system may automatically update an agent's status or initiate deactivation. This reduces administrative oversight while ensuring compliance and consistency across the agency's workforce. The automation ensures scalability, allowing agencies to grow their workforce without proportionally increasing operational costs.

One of the most inventive aspects of the system lies in the leads and influencer marketplace module. This module enables influencers and advertisers to generate unique referral links that are tracked throughout the entire booking lifecycle. Once a referred lead books a trip, the system attributes the booking back to the original source and calculates rewards accordingly. Influencers can access dashboards to monitor referral performance, campaign analytics, and their earned rewards. This creates a powerful, performance-driven ecosystem that aligns the interests of influencers, agencies, and suppliers.

An advanced gamification model is embedded within the influencer module to drive higher engagement and performance. Influencers are categorized into tiered levels such as bronze, gold, and diamond, each providing progressively more valuable incentives. For instance, bronze-tier influencers may earn commission only, while diamond-tier users may receive commissions, stipends, and exclusive travel perks. Tier progression is dynamically determined by measurable factors such as lead conversion rates, total booking revenue, and client satisfaction ratings. This incentivized framework encourages influencers to optimize their campaigns, post high-quality content, and sustain long-term collaboration with agencies.

The booking module is designed to support seamless trip reservations initiated by either travel agents or clients. Unlike traditional agency tools, this module connects to multiple supplier APIs to source live pricing and availability for transportation, lodging, and activities. It allows a full trip to be booked within a single session while ensuring the agent's or agency's commission structure is preserved. This reduces the need for manual bookings and follow-ups, enabling greater efficiency and scalability. Additionally, it supports financial processing such as credit card payments and optional insurance add-ons.

Another key feature is the itinerary module, which compiles booking data into client-facing travel documents. These itineraries can include detailed travel plans such as flights, accommodations, transfers, and excursions. The generated output is formatted for delivery as downloadable PDFs, interactive web portals, or mobile links. This provides a professional and convenient customer experience while reducing the agency's document preparation workload. Clients can access all relevant trip details in one place, improving satisfaction and reducing service inquiries.

The system includes a lead routing algorithm that prioritizes quality matching between agents and potential clients. Leads are initially submitted to an agent queue, where an algorithm evaluates agent qualifications, specialties, and availability. Agents must expend lead credits to claim a lead, incentivizing them to select opportunities they are best suited to handle. This approach improves conversion rates by aligning leads with agents who are more likely to close the booking. Moreover, the algorithm incorporates administrator settings to customize lead distribution based on agency strategy or contractual obligations.

Suppliers interact with the system through a dedicated web-based portal that centralizes all promotional and performance data. They can access metrics such as sales volume by influencer, campaign reach, or agent engagement. Suppliers may also submit promotions, request influencer sponsorships, and even place orders for new advertising campaigns directly through the portal. This two-way interaction promotes collaboration and provides visibility into the downstream impact of their investments. By aligning suppliers with campaign results, the system improves transparency and enables smarter budget allocation.

A communication module underpins the entire platform, allowing all stakeholders to exchange information securely and efficiently. This includes messaging between agents and clients, influencer and agency correspondence, and supplier support communications. The module supports real-time and asynchronous communications and is integrated with the platform's logging and tracking systems. This ensures that all interactions are documented, traceable, and available for auditing if needed. The inclusion of communication tools within the platform eliminates the need for fragmented external systems such as email or third-party messaging apps. All referral links and booking associations are logged by the system in real-time, forming a transparent chain of data from advertisement to commission payout. The system visually displays which campaign or influencer generated a booking, the revenue produced, and how commissions were allocated. This allows agencies to determine which marketing strategies are working and which are underperforming.

Influencers can use this data to improve their promotional tactics and maximize earnings. The transparency supports fair compensation and fosters trust among all parties involved.

Administrative control is granular and flexible, enabling agencies to customize user permissions and data access. For example, administrators can define different roles for agents, influencers, vendors, and internal staff, each with specific interface views and action privileges. These controls prevent unauthorized data access and reduce the risk of miscommunication. Settings can also be used to enforce compliance with legal, financial, or operational policies. As the agency grows, these role-based controls make system governance easier and more secure. The system features a robust influencer dashboard where users can track key performance indicators including referral traffic, conversions, commission totals, and tier progress. They can also see metrics like average booking value, click-through rates, and audience demographics. This data is visualized through charts, graphs, and leaderboards that promote friendly competition and increased activity. By enabling influencers to optimize their own strategies, the system promotes organic growth and more effective lead generation. Influencers are more likely to remain engaged when they can see the direct results of their efforts.

Payment processing is fully integrated and supports automated commission distribution based on completed bookings. Once a booking is finalized and verified, payments are allocated to the corresponding influencer, agent, and agency according to predefined structures. This eliminates manual tracking, reduces errors, and accelerates payment timelines. Integrated APIs with banking systems or payment gateways ensure funds are securely transferred to designated recipients. The automated process improves cash flow management and enhances user trust in the platform.

The system is accessible via both mobile and desktop interfaces and is responsive to device type and screen size. This ensures that agents and influencers can work on-the-go without loss of functionality. Travel suppliers and agency administrators can monitor campaigns, view reports, or adjust settings from any location. The accessibility supports remote work and time-sensitive decision-making. A consistent user experience across devices reduces the learning curve and encourages wider adoption of the platform.

In one embodiment, the system uses machine learning algorithms to predict future lead behavior and conversion likelihood. This predictive analytics feature can prioritize lead assignments, adjust campaign targeting, or forecast commission earnings. Agencies can identify underperforming campaigns early and redirect resources accordingly. Influencers can see which content types or networks yield higher returns. These insights enable data-driven decisions and enhance the platform's overall marketing efficiency.

Multi-supplier integration allows agents and clients to build complex itineraries involving products from different vendors in a single transaction. This includes flights, hotels, rental cars, guided tours, and other travel services. Each product is booked through the respective supplier's API, and the platform synchronizes all confirmations and financials. The system ensures that all commission structures are respected even when bookings span multiple providers. This unified booking experience is more convenient for users and opens up cross-selling opportunities for agencies.

The system is hosted in a cloud environment that supports scalable infrastructure and high availability. Redundant storage and automatic failover mechanisms ensure data integrity and minimal downtime. Cloud deployment also allows for rapid system updates, patching, and integration of new features. Agencies benefit from reduced IT overhead and enhanced reliability. As usage scales, the platform can accommodate growth without performance degradation. A modular architecture supports integration with third-party tools, APIs, and analytics platforms. This enables custom extensions for CRM tools, advertising networks, financial software, and supplier databases. Developers can create plug-ins to tailor the system to agency-specific needs without altering the core platform. This openness facilitates innovation and compatibility with existing software ecosystems. Customization options make the system adaptable to a wide range of business models.

By consolidating CRM functions, advertising management, booking tools, and financial tracking into a single interface, the platform eliminates the need for multiple software tools. This reduces operational complexity and minimizes data silos that often plague multi-system environments. Users benefit from a unified workflow where data flows seamlessly across modules. This holistic view improves strategic decision-making, speeds up transactions, and reduces the chances of human error. Agencies can focus more on growing their business rather than troubleshooting software incompatibilities.

In summary, the invention delivers a transformative platform for the travel industry by integrating automated tools, performance-based marketing, and supplier collaboration into a unified system. Its gamified structure encourages participation, while its automation features enhance operational efficiency and reduce overhead. The platform delivers transparency, scalability, and actionable insights for all stakeholders in the travel value chain. By leveraging modern technology in a travel-focused context, the disclosed system redefines how travel services are marketed, sold, and managed. It empowers agencies to grow sustainably while offering clients a more personalized and responsive experience.

BRIEF DESCRIPTION OF THE DRAWINGS

A complete understanding of the present embodiments and the advantages and features thereof will be more readily understood by reference to the following detailed description when considered in conjunction with the accompanying drawings wherein:

FIG. 3 illustrates a flowchart of the user flow process, according to some embodiments.

DETAILED DESCRIPTION

Figure 1:
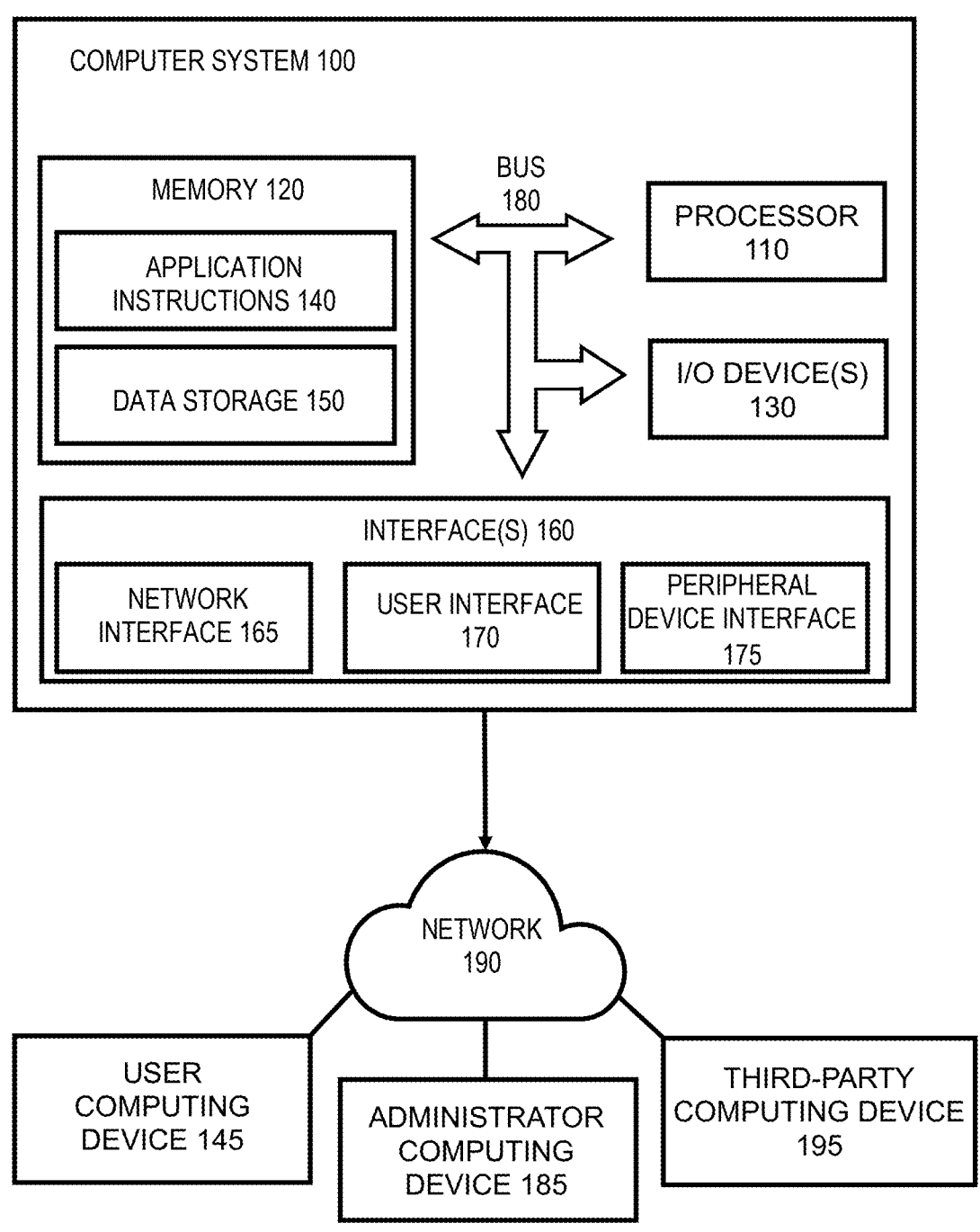
FIG. 1 illustrates a system architecture diagram of the network infrastructure, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing in detail exemplary embodiments, it is noted that the embodiments reside primarily in combinations of components related to particular devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided herein relate to an integrated travel agency CRM and booking system with influencer-driven and advertiser-driven lead generation and automated agent management. The system provides a comprehensive platform for a travel agency CRM and booking platform by integrating influencers, clients, advertising campaigns, suppliers, agencies, and agents into a cohesive and gamified platform. The system aids in optimizing lead conversion and providing detailed supplier reports on booking data related to leads or agents.

One skilled in the arts will readily understand that the system and various aspects of the system which are described herein may be implemented by various travel providers including cruise lines, airlines, rental car agencies, and the like. Applying the teachings of this disclosure to similar travel-related business models and enterprises remains within the scope of the present disclosure.

The system includes A CRM, an accounting and reporting system, an onboarding system, a leads system/influencer marketplace, a booking system, and an itinerary builder. The system is designed to enhance operational efficiency, improve sales conversions, and streamline travel management processes.

In some embodiments, the CRM system functions in a similar manner to a traditional CRM system. The CRM system stores, manages, and processes client information, data storage, provides reminders and alerts, statuses, and other client-related information. The CRM may record booking data linked to clients, including product details, prices, revenues, commissions, confirmation numbers, vendor names, and travel dates. The CRM may interface with suppliers via an API or manual entry to exchange reservation data and processes credit card payments though API integrations.

In some embodiments, the accounting and reporting system manages travel agency financial transactions including commission payments and employs algorithms to associate commissions with specific agents. The accounting and reporting system generates reports for suppliers, agencies, agents, and influencers on booking data and tracks advertisement campaign conversions. The accounting and reporting system may report on KPIs such as revenue, commissions, booking numbers, and booking details across various levels, integrating these insights with other modules.

In some embodiments, the onboarding system automates the onboarding of agents, verifies identification and bank details, and conducts background checks. The onboarding system automatically creates accounts for new agents and manages agent removal based on performance or other business criteria.

In some embodiments, the leads system and influencer marketplace generates landing pages and web forms for influencers who earn points and commission splits from leads they have generated. The leads system and influencer marketplace is capable of associating bookings directly to specific ads or social networks to rewarding influencers with points redeemable for trips based on booking revenue. The leads system and influencer marketplace features tiered rewards for influencers and uses algorithms to manage lead distribution among agents and may also allow suppliers to view sales data linked to specific leads, sponsor influencers, and manage promotions.

In some embodiments, the booking system connects with vendors to allow agents to book trips seamlessly through the booking portal. The booking system may integrate data from other modules for a unified process. The booking system may also process or otherwise manage credit card transactions and is designed to eventually support direct client bookings through a public interface.

In some embodiments, the itinerary builder generates detailed itineraries based on data from other modules to provide clients with comprehensive travel documents like PDFs or web app links for each trip which may encompass all travel elements.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computing device 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor (s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 150, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., Android, C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include, or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 100 may include a user computing device 145, an administrator computing device 185 and a third-party computing device 195 each in communication via the network 190. The administrator computing device 185 is utilized by an administrative user to moderate content and to perform other administrative functions. The third-party computing device 195 may be utilized by third parties to receive communications from the user computing device, transmit communications to the user via the network, and otherwise interact with the various functionalities of the system.

Figure 2:
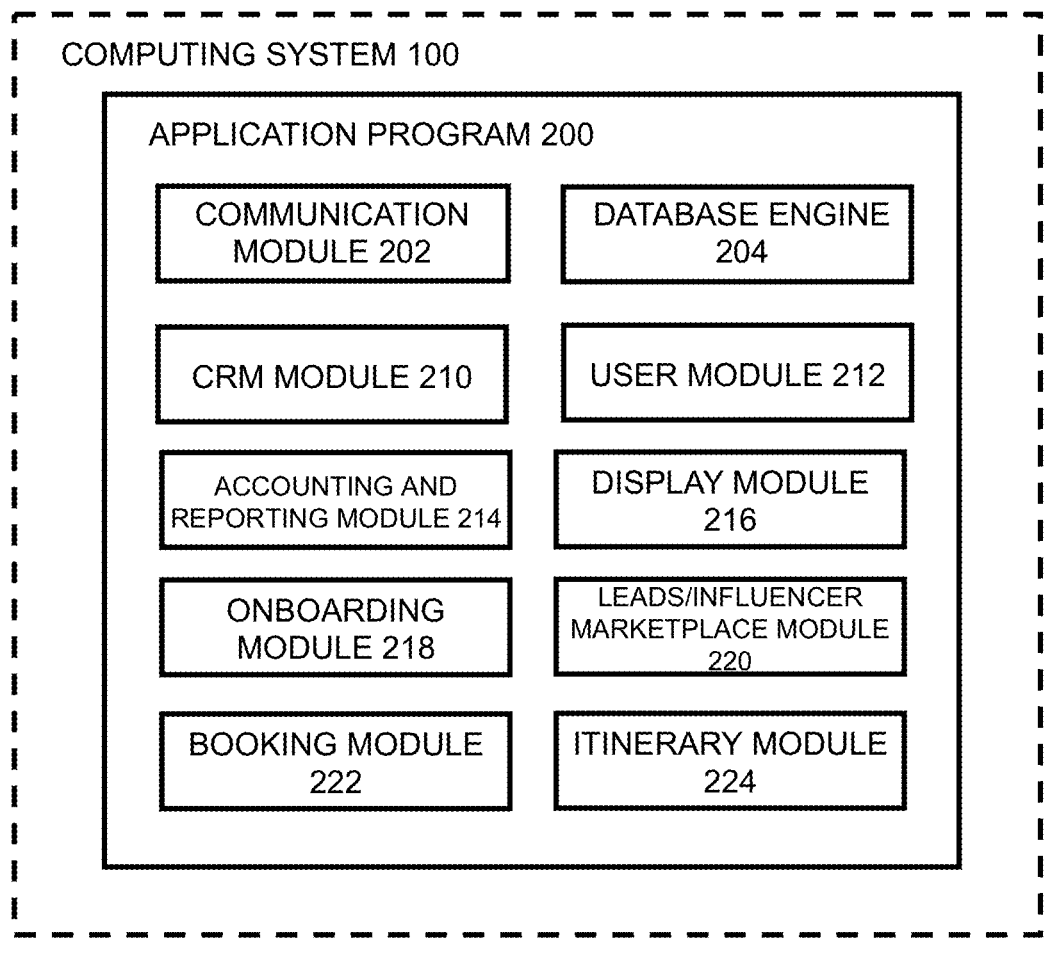
FIG. 2 illustrates a block diagram of the application program in communication with the computing system, according to some embodiments.

FIG. 2 illustrates an example computer architecture for the application program 200 operated via the computing system 100. The computer system 100 comprises several modules and engines configured to execute the functionalities of the application program 200, and a database engine 204 configured to facilitate how data is stored and managed in one or more databases. In particular, FIG. 2 is a block diagram showing the modules and engines needed to perform specific tasks within the application program 200.

Referring to FIG. 2, the computing system 100 operating the application program 200 comprises one or more modules having the necessary routines and data structures for performing specific tasks, and one or more engines configured to determine how the platform manages and manipulates data. In some embodiments, the application program 200 comprises one or more of a communication module 202, a database engine 204, a CRM module 210, a user module 212, an accounting and reporting module 214, a display module 216, an onboarding module 218, a leads/influencer marketplace module 220, a booking module 222, and an itinerary module 224.

In some embodiments, the communication module 202 is configured for receiving, processing, and transmitting a user command and/or one or more data streams. In such embodiments, the communication module 202 performs communication functions between various devices, including the user computing device 145, the administrator computing device 185, and a third-party computing device 195. In some embodiments, the communication module 202 is configured to allow one or more users of the system, including a third-party, to communicate with one another. In some embodiments, the communications module 202 is configured to maintain one or more communication sessions with one or more servers, the administrative computing device 185, and/or one or more third-party computing device(s) 195. In some embodiments, the communication module 202 allows each user to transmit and receive information which may be used by the system.

The communication module 202 is configured to facilitate the exchange of data, commands, and messages between various user roles interacting with the platform, including agents, clients, influencers, suppliers, and administrative personnel. It serves as the primary conduit through which operational interactions occur, such as submitting lead forms, booking confirmations, or transmitting account-related updates.

In one embodiment, the communication module 202 supports both synchronous and asynchronous messaging protocols to accommodate diverse user environments and preferences. For example, real-time chat may be used between agents and clients during the booking process, while asynchronous messaging may be employed for sending booking reminders, onboarding notices, or campaign results. The system may also utilize secure transport protocols (e.g., HTTPS, TLS) to maintain data confidentiality.

The communication module 202 may also maintain session logs and user interaction histories for auditing and customer service purposes. These records are stored within the system database and may be surfaced via the CRM module 210 or the administrator dashboard for quality control and dispute resolution. In some embodiments, the module integrates with email APIs, SMS gateways, or mobile push notification services to expand communication reach.

In some embodiments, a database engine 204 is configured to facilitate the storage, management, and retrieval of data to and from one or more storage mediums, such as the one or more internal databases described herein. In some embodiments, the database engine 204 is coupled to an external storage system. In some embodiments, the database engine 204 is configured to apply changes to one or more databases. In some embodiments, the database engine 204 comprises a search engine component for searching through thousands of data sources stored in different locations. The database engine 204 allows each user and module associated with the system to transmit and receive information stored in various databases.

The database engine 204 is responsible for managing the storage, retrieval, and indexing of all structured and unstructured data within the application program 200. It interfaces with all other modules to ensure data persistence and availability, including booking records, user credentials, referral links, itinerary data, financial transactions, and more.

In some embodiments, the database engine 204 includes an embedded search engine that allows stakeholders to retrieve data through keyword queries, filters, or report generators. This capability is critical for accessing historical booking data, campaign performance metrics, and lead conversion analytics. Data synchronization processes may be managed using timestamps, caching techniques, and conflict resolution algorithms to ensure consistency across devices and user roles.

The database engine 204 may also support encryption-at-rest and role-based data access to comply with industry security standards and regulatory requirements. It can be implemented using relational (e.g., SQL) or non-relational (e.g., NoSQL) data models depending on scalability requirements and data structure complexity.

In some embodiments, the CRM module 210 is operable to store, manage, and process client information, data storage, provides reminders and alerts, statuses, and other client-related information. The CRM module 210 may record booking data linked to clients, including product details, prices, revenues, commissions, confirmation numbers, vendor names, and travel dates. Further, the CRM module 210 may interface with suppliers via an API or manual entry to exchange reservation data and processes credit card payments though API integrations.

The CRM module 210 enables the management and tracking of client interactions, preferences, and travel history throughout the customer lifecycle. It provides agents with a dashboard to input, view, and update customer records, including contact details, travel preferences, booking history, and communication logs.

The CRM module 210 is configured to automatically link clients to associated bookings, including vendor data, confirmation numbers, pricing, and commissions. It may interface with supplier APIs to retrieve reservation updates and sync those with the client's profile. Custom alerts, reminders, and task lists may be generated based on client activity, such as reminders to follow up on open quotes or re-engage with dormant leads.

In some embodiments, the CRM module 210 is integrated with the influencer tracking system, enabling a traceable relationship between a client and the influencer or campaign that generated the lead. This supports downstream attribution in the accounting and reporting module 214.

In some embodiments, the user module 212 facilitates the creation of a user account for the application system. The user module 212 may allow the user to input account information, establish user permissions and the like.

The user module 212 manages user account creation, authentication, profile updates, and role assignments within the system. Upon registration, each user, whether an agent, supplier, influencer, or client, is provisioned with credentials and granted access rights based on their role.

In some embodiments, the user module 212 supports multi-factor authentication (MFA), password recovery, and user activity tracking. Role-based access controls (RBAC)

allow administrators to define which system components and data each user can access, modify, or view. The user module may also store user preferences, language settings, and interface customizations for a more personalized user experience.

In some embodiments, the accounting and reporting module 214 is operable to manage travel agency financial transactions including commission payments and employs algorithms to associate commissions with specific agents. The accounting and reporting module 214 generates reports for suppliers, agencies, agents, and influencers on booking data and tracks advertisement campaign conversions. The accounting and reporting module 214 may report on KPIs such as revenue, commissions, booking numbers, and booking details across various levels, integrating these insights with other modules.

The accounting and reporting module 214 is configured to monitor financial flows associated with bookings and advertising campaigns. It calculates and logs commission splits between agents, agencies, and influencers, based on preconfigured rules and attribution models. These transactions are linked to user profiles and stored in the database engine 204.

In addition to basic financial tracking, the module generates KPI dashboards that provide visibility into booking performance, campaign efficiency, and profitability metrics. This may include metrics such as revenue per booking, average customer spend, close rate by agent, or return on ad spend.

The module may also interface with external financial platforms (e.g., payment gateways, accounting software) to support automated payout processing and ledger synchronization. In some cases, it is linked to a collections system that dispatches reminders and overdue notices to suppliers or clients, based on defined business rules.

The accounting and reporting module 214 may be in operable communication with a collections management system which allows suppliers to pay the agency directly via a credit card, ach transaction, etc. The collections management system may transmit automated emails, messages, etc. to overdue vendors.

In some embodiments, the display module 216 is configured to display one or more graphic user interfaces, including, e.g., one or more user interfaces, one or more consumer interfaces, one or more video presenter interfaces, etc. In some embodiments, the display module 216 is configured to temporarily generate and display various pieces of information in response to one or more commands or operations. The various pieces of information or data generated and displayed may be transiently generated and displayed, and the displayed content in the display module 216 may be refreshed and replaced with different content upon the receipt of different commands or operations in some embodiments. In such embodiments, the various pieces of information generated and displayed in a display module 216 may not be persistently stored.

The display module 216 governs the visual presentation of the platform across various devices and user roles. It dynamically generates user interfaces for agents, influencers, suppliers, and clients, ensuring that each interface includes only the functions relevant to the user's role and permissions.

It supports responsive design principles and device-specific rendering, allowing the platform to operate seamlessly on desktop, tablet, and mobile devices. The display module 216 also incorporates data visualization components such as dashboards, charts, graphs, and booking timelines to enhance usability and data interpretation.

In some embodiments, the module enables customization of interface layouts, color themes, or widget placement, allowing users to tailor their workspace to suit their preferences or job functions.

In some embodiments, the onboarding module 218 is operable to automate the onboarding of agents and may verify identification and bank details. Further, the onboarding module 218 may conducts background checks. The onboarding system automatically creates accounts for new agents and manages agent removal based on performance or other business criteria.

The onboarding module 218 streamlines the process of enrolling new agents, influencers, or supplier users into the platform. It automates identity verification, bank account integration, and electronic agreement execution through secure forms and third-party API integrations.

Once enrolled, the module assigns permissions based on the user's role and organizational hierarchy. Performance-based triggers within the onboarding module can automatically update an agent's status, suspend accounts due to inactivity, or escalate newly active users to administrative review.

Additionally, the onboarding module 218 may integrate with background check services to validate the credibility of new agents. Its automation features reduce administrative workload while improving regulatory compliance and platform integrity.

In some embodiments, the leads/influencer marketplace module 220 is operable to generate landing pages and web forms for influencers who earn points and commission splits from leads they have generated. The leads system and influencer marketplace module 220 is capable of associating bookings directly to specific ads or social networks to rewarding influencers with points redeemable for trips based on booking revenue. The leads system and influencer marketplace features tiered rewards for influencers and uses algorithms to manage lead distribution among agents and may also allow suppliers to view sales data linked to specific leads, sponsor influencers, and manage promotions.

In some embodiments the leads/influencer marketplace module 220 allows for an advertiser or influencer to enter query strings tied back to advertisements or social networks to allow a booking to be associated directly to an advertisement. Every trip booked through this earns trip points for the influencers based off the revenue of the trip booked. Points can be redeemed for free trips or other rewards. Influencers may have tiers, bronze which is commission only, gold, which is commission and free trip opportunities, and diamond which is commission, stipend, and free trip opportunities. While the aforementioned exampled are provided for the influencer tiers, one skilled in the arts will readily understand that tiers may vary.

The leads/influencer marketplace module 220 provides tools for influencers and advertisers to generate referral links, landing pages, and lead forms. Each referral is tracked through the lifecycle of the lead, from form submission to booking, allowing for clear attribution of marketing efforts.

Influencers earn rewards in the form of commission, points, or tier upgrades based on the success of their campaigns. Tiers may include incentives such as free travel, stipends, or priority access to campaigns. The system may automatically adjust influencer status based on conversion rates or total revenue generated.

Agents access a lead queue from this module, where they can view and claim incoming leads using lead credits. The module includes a matching algorithm that considers agent qualifications, historical performance, and niche specialties when routing leads. Suppliers can use the same module to sponsor campaigns, monitor conversions, and access lead-level sales data.

When a lead is submitted through a link it goes to the agent lead queue which has algorithms to determine which agents are qualified. Agents use up a lead credit to claim a lead and receive exclusive access to handle that lead (and pay a commission split premium for it). The algorithm determines the closure rate for the advertising source or influencer points that get rewarded based on successful sale of a travel product to the lead. It may also restrict leads routing based off agent's activity, administrator intervention, or qualifications and niches.

On the supplier side of the process, a supplier can see data about their sales whether the sale came through a specific lead program/lead source/influencer or other lead sources and link them to campaigns and advertising purchased by the supplier. Further, the supplier may order new advertising campaigns through the portal. Suppliers may also issue promotions to agents to encourage more sales of their brand. Further, suppliers may also sponsor influencers as well as grab a list of all active agents. Agency administrators and agents may also see data on leads as linked to bookings and clients.

The influencer tracking aspect may be integrated with the public-facing aspects of the system.

In some embodiments, the booking module 222 is operable to connect with vendors to allow agents to book trips seamlessly through the booking portal. The booking module 222 may integrate data from other modules for a unified process. The booking module 222 may also process or otherwise manage credit card transactions and is designed to support direct client bookings. The booking module 222 may also connect with wholesalers and partners using an integrated API.

In some embodiments, the booking module 222 may connect to multiple API's and suppliers to find the best rates for various travel elements including hotel fees, transportation, etc.

In some embodiments, an agent-facing travel booking system is provided which enables the agents to book complete trips with travel providers. This can include airfare (or other means of transportation), hotel bookings, rental car bookings, tours, transfers, etc. The accounting module and reporting system may then automatically account for the executed transactions.

In some embodiments, the booking module 222 is operable to permit travel booking via a customer and an agent.

The booking module 222 is the transactional engine of the platform, enabling agents and clients to search for, configure, and confirm travel bookings. It connects to vendor APIs to access real-time pricing and availability for services such as flights, hotels, car rentals, tours, and cruises.

The module supports bundled travel packages as well as individual service bookings. It also integrates payment processing tools to securely capture client payments, apply commissions, and confirm reservations. In some embodiments, the booking module can generate invoices and confirmation documents directly within the platform.

Advanced functionality may include dynamic pricing suggestions, upsell prompts, and automated service alerts (e.g., flight delays). Bookings are stored within the CRM and also populate the itinerary module 224 to create a seamless post-booking workflow.

In some embodiments, the itinerary module 224 is operable to generate detailed itineraries based on data from other modules to provide clients with comprehensive travel documents like PDFs or web app links for each trip which may encompass all travel elements. The itinerary is generated for each trip on a trip-by-trip bases and can efficiently generate an itinerary including various travel factors including hotels, air travel (or other forms of transportation), transfers, tours, events, etc.

The itinerary module 224 compiles booking data from the CRM, booking, and user modules to generate a structured travel itinerary. The output includes flight schedules, hotel bookings, activity reservations, transportation links, and contact information.

The generated itinerary may be delivered as a PDF, printed document, or interactive web link. Each itinerary is customizable to the client's needs and may include branding elements, notes, and promotional offers.

This module streamlines the client experience by consolidating all trip details into a single resource. It reduces the need for agent involvement in documentation and provides clients with up-to-date, accessible travel plans. Updates to bookings automatically reflect in the itinerary in real time or upon agent confirmation.

FIG. 3 illustrates a flowchart of the influencer user flow process, detailing the step-by-step interactions between the influencer, the platform, and other stakeholders in the system. In step 300, the user either logs into an existing account or registers with the platform for the first time. During registration, the user may select a role (e.g., influencer, agent, supplier) and provide basic profile information including contact details, verification documentation, and linked social media accounts. The platform may use OAuth or other secure authentication methods to confirm the identity of the influencer, while also enabling platform-integrated permissions for content sharing and campaign tracking.

Once registered, the influencer is granted access to a personalized dashboard which includes tools for generating referral links, tracking campaign performance, and monitoring earned rewards. The login session also initializes background processes for activity logging and access control, ensuring that user-specific permissions govern the modules visible within the application. Returning users may also receive notifications about recent campaign performance, pending commissions, or updates to influencer tier status.

In step 310, the influencer creates a unique referral link through the platform interface. This link can be embedded in various types of content, such as videos, blog posts, social media captions, or digital advertisements. The referral link is automatically appended with a tracking token that allows the system to associate any user interaction or booking with the originating influencer and the specific advertisement. Each referral is tied to a landing page containing a lead form, which collects user information such as name, email address, travel preferences, and interests.

This step enables robust attribution capabilities, allowing stakeholders to trace a lead's entire lifecycle from initial click to final booking. Influencers can generate multiple referral links per campaign, customize them for specific audiences, or tie them to particular destinations or offers. This level of granularity allows for fine-tuned analysis of marketing effectiveness and ensures that influencers are properly credited for their promotional efforts. Advanced versions of this module may even include heatmap analytics or click-through metrics to help optimize future campaigns.

In step 320, once a lead is submitted via the referral link and a travel booking is confirmed through the platform, the system automatically associates the resulting transaction with the influencer's campaign. This association includes not only the booking details, but also the original advertisement used, such as the video, social media post, or email campaign that generated the interest. This allows agencies and stakeholders to visualize the full funnel of engagement and determine which advertisements are yielding actual conversions.

The system may further allow the booking to be tied to a supplier-funded advertising campaign or cooperative marketing initiative. This enables suppliers to understand which campaigns are generating bookings and empowers them to strategically sponsor future influencer efforts. The ability to retroactively trace bookings to specific advertisements significantly enhances accountability and empowers all parties to invest more intelligently in influencer-based marketing.

In step 330, the influencer is rewarded for the successful conversion based on a gamified points system. Points may be redeemable for free travel, monetary bonuses, or exclusive campaign access. In addition to point accrual, influencers may be ranked in tiers such as bronze, silver, gold, or diamond, with each level offering escalating benefits. For example, diamond-tier influencers might receive a combination of commission, promotional stipends, and early access to high-value campaign opportunities.

The influencer's tier status is recalculated dynamically based on closure rate, booking volume, revenue generated, and engagement metrics. This tiered structure provides powerful incentives for influencers to improve performance and continuously promote the platform's offerings. The gamification aspect keeps users motivated and engaged, while also enabling agencies and suppliers to allocate marketing resources to the most effective promoters.

In step 340, after a booking is completed, the system calculates and distributes payments to all relevant parties. This includes the influencer who referred the lead, the agent who closed the booking, and the agency facilitating the transaction. Payment logic is governed by customizable commission structures, which may vary based on campaign type, booking amount, or tiered reward status. The platform integrates with financial APIs to execute automated payouts, generate audit trails, and maintain compliance with financial reporting obligations.

This step eliminates the need for manual reconciliation of earnings and ensures timely, accurate compensation for all involved parties. It also improves transparency and reduces administrative overhead for agencies and suppliers alike. All payments are logged in the accounting and reporting module, allowing users to view historical earnings, pending distributions, and tax documentation as needed.

In step 350, suppliers gain access to a dedicated portal through which they can view data associated with lead sources, booking transactions, agent performance, and marketing campaign effectiveness. Suppliers can evaluate their own brand's sales data as compared to competitors, gaining insights into market share and engagement patterns. The portal may also offer tools to issue promotions, sponsor influencers, or create new advertising campaigns directly within the system.

Additionally, the supplier portal includes a marketplace interface where advertisers and influencers can connect with suppliers seeking promotional partnerships. Suppliers can view influencer profiles, performance metrics, and audience demographics to make informed decisions about sponsorships. This bi-directional visibility facilitates cooperative marketing strategies and allows suppliers to target high-performing agents and influencers with tailored incentives.

In step 360, all parties, agents, influencers, agencies, and suppliers, are provided access to a suite of KPI reports through the reporting interface. These reports quantify campaign performance, return on investment (ROI), engagement trends, and other relevant data points. Influencers can analyze click-through rates and conversion rates across different platforms, while suppliers can assess which campaigns are yielding bookings.

Agencies benefit from detailed reports on lead generation sources, agent productivity, and client satisfaction. These insights inform strategic planning, training programs, and resource allocation. Because the system captures and correlates data across all modules, users are equipped with a comprehensive view of their operational performance.

Ultimately, the system enables a level of transparency previously unavailable in traditional travel marketing ecosystems. Influencers are incentivized not only to generate leads, but to optimize for conversions that produce measurable revenue. Agents are empowered with quality leads and can see the full context of a client's journey from advertisement to booking. Agencies gain full oversight of performance and financials, while suppliers can make smarter promotional investments.

This interconnected flow of data and reward distribution encourages all parties to collaborate efficiently and focus on outcomes. By quantifying each user's contribution to the booking funnel, the system creates a transparent and accountable marketplace that drives growth and customer satisfaction.

In one embodiment, the booking module is configured to simultaneously search across multiple provider databases to retrieve and compare available travel products in real time. This simultaneous multi-provider search includes both commissionable rates, which generate revenue for agents and agencies, and NET rates, which are non-commissionable but may offer lower upfront pricing. The system analyzes both pricing structures and provides the agent with comparative analytics that highlight margin opportunities, supplier costs, and optimal combinations. This dual-rate comparison enhances agent decision-making and allows for greater pricing transparency when packaging custom trips for clients.

In another embodiment, the system's advertising attribution framework, originally designed for influencer tracking, has been extended to support traditional ad providers. Each ad campaign, regardless of whether it is influencer-generated or placed through digital ad networks, is assigned a tracking identifier similar to referral links. This enables the system to track performance metrics such as click-through rates, lead conversion rates, and booking revenue directly associated with third-party advertisements. This unified tracking model provides agencies with comparable data across all marketing sources, facilitating better budget allocation and real-time ad optimization.

The booking module also supports a unified itinerary-building functionality that allows agents and users to package disparate booking items into a single trip. Flights, hotels, ground transfers, car rentals, and tours can be selected and grouped into one trip record with a shared confirmation number. The system automatically generates a consolidated itinerary document and confirmation email, streamlining the post-booking experience. This bundled approach reduces client confusion, simplifies communications, and reinforces the perception of a single, curated travel experience even when multiple vendors are involved.

In yet another forthcoming embodiment, the platform will integrate an artificial intelligence (AI) module to further enhance system capabilities. The AI module will support natural language queries and can autonomously assist with trip planning, data analytics, and even booking execution. Agents or clients may input requests such as "Plan a 7-day European vacation for under $3,000" or "Find the best oceanfront resort with kids' programs," and the AI will return optimal trip packages by querying the booking module and CRM data. This AI interface will reduce the time required for planning and offer a more dynamic, conversational experience.

In support of agent operations, the AI module will also serve as a knowledge assistant trained on the platform's proprietary travel agent training database. Agents can query the AI for best practices, destination-specific insights, regulatory considerations, or onboarding procedures. For example, a user could ask, "How do I book a cruise group on credit hold?" and receive context-specific instructions sourced from the system's internal documentation. This functionality will help new agents onboard faster and assist experienced agents in keeping current with evolving industry protocols.

The knowledge base referenced above comprises a structured repository of all internal travel agent training resources. These resources include tutorials, onboarding checklists, supplier-specific policies, case studies, sales scripts, and FAQs. Content is indexed and searchable via keywords, tags, or natural language queries facilitated by the AI module. This ensures agents have immediate access to institutional knowledge at the point of need, enhancing efficiency and reducing reliance on manual support from agency administrators.

In another future embodiment, the system will be extended into a mobile application that synchronizes seamlessly with the desktop platform. The app will allow agents to perform all CRM-related functions from their smartphone or tablet, including lead management, booking updates, and client messaging. On the client-facing side, end users will have access to their travel itineraries, real-time updates, and chat functionality that connects directly with their assigned agent. This bi-directional communication capability improves responsiveness and strengthens the agent-client relationship throughout the travel lifecycle.

The app will also support push notifications, offline itinerary access, and secure login through biometric authentication. All data entered via the app will be synchronized in real time with the central database and displayed through the CRM and booking modules. By maintaining a unified back-end, the system ensures consistency across all touchpoints and provides a continuous user experience whether accessed via desktop or mobile.

In one security-focused embodiment, the system has been enhanced with 3D Secure (3DS) authentication for credit card processing. This anti-fraud measure requires cardholders to complete an additional verification step, such as entering a one-time passcode or confirming via their banking app, during the payment process. This layer of authentication helps reduce the risk of unauthorized transactions and chargebacks, which is especially important in high-ticket travel bookings. Integration with 3DS is achieved through the system's existing payment gateway API and is fully compliant with PCI DSS standards.

The implementation of 3DS ensures that clients feel more confident submitting payments through the platform, while also protecting agencies from revenue loss due to fraud. Agents are notified in real time whether the transaction has passed 3DS verification, and any flagged transactions can be escalated for manual review. This creates a secure, transparent payment environment that builds trust and mitigates financial risk for all parties involved.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch.

Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrase "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

What is claimed is:

1. A system for providing an integrated travel agency CRM and booking system including influencer-driven and advertiser-driven lead generation and automated agent management, the system comprising:

at least one user computing device in operable connection with a user network;

an application server in operable communication with the user network, the application server configured to host an application program for providing an integrated travel agency CRM and booking system including influencer-driven and advertiser-driven lead generation and automated agent management, the application program having a user interface module for providing access to the application program via the at least one user computing device;

a CRM module that enables the integration of real-time data sharing between two or more parties, the CRM module being configured to maintain linked client records and associated booking data including confirmation numbers, vendor identifiers, pricing, commission percentages, and travel dates and to surface such records to authenticated users in role-based dashboards, with attribution to an originating influencer campaign for downstream financial reporting, the CRM module further configured to automatically link clients to associated bookings and synchronize reservation updates retrieved via supplier APIs with each client's profile, and to generate custom alerts, reminders, and task lists based on detected client activity patterns;

an accounting and reporting module is operable to associate a commission payment to an advertisement or one or more users, the account and reporting module is further operable to monitor conversion metrics to generate a KPI report, the accounting and reporting module further configured to automatically calculate commission splits based on preconfigured attribution rules that link bookings to specific advertisements or influencer campaigns and to generate KPI dashboards including lead-to-booking ratios, revenue per booking, and return on ad spend;

an onboarding module is operable to automate an agent onboarding process via the verification of the agent's identity, to automate financial account integration, to automate a background check, and to automate the status of the agent based on a plurality of metrics, wherein the onboarding module integrates third-party identity, banking, and background-check APIs, assigns permissions based on organizational roles, and triggers automatic status updates or deactivation from performance data;

a leads/influencer marketplace module is operable to gamify a lead generation process and to provide a reward associated with a booking transaction, wherein the leads/influencer marketplace module generates unique referral links and landing pages that carry tracking tokens tying each lead and resulting booking to a specific advertisement or social post, maintains tiered influencer rewards based on conversion and revenue metrics, and routes leads to agents via a queue that requires lead credits and evaluates agent qualifications and specialties, the leads/influencer marketplace module further configured to deploy pixel tracking across influencer social content and landing pages to capture conversion events including link clicks, email signups, and purchases, and to dynamically recalculate influencer tier status based on measured conversion rates, total booking revenue, and client satisfaction ratings;

a booking module is operable to permit travel booking via a customer and an agent, the booking module connecting to multiple supplier and wholesaler APIs to obtain real-time availability and pricing for flights, lodging, transportation, tours, and cruises, securely processing client payments and generating invoices and confirmations, and persisting booking results into the CRM and itinerary modules for downstream workflow, the booking module further configured to simultaneously search across multiple provider databases to retrieve and compare commissionable rates and NET rates in real time and to provide agents with comparative analytics highlighting margin opportunities, supplier costs, and optimal rate combinations; and an itinerary module to generate an itinerary using information related to the travel booking, the itinerary module compiling booking data into a client-facing document delivered as a PDF or interactive web link and automatically updating the itinerary in real time upon booking changes.

2. The system of claim 1, wherein the influencer marketplace module includes tiered reward levels based on booking revenue.

3. The system of claim 1, wherein the booking module integrates with external travel supplier APIs to obtain real-time availability and pricing.

4. The system of claim 1, wherein the onboarding module includes automated background checks and financial account setup.

5. The system of claim 1, wherein the accounting and reporting module includes a collections management system to issue automated vendor payment reminders.

6. The system of claim 1, wherein the itinerary module supports output in both PDF and web link formats.

7. The system of claim 1, wherein the CRM module records booking-specific details such as confirmation numbers, vendor identities, and commission structures.

* * * * *